(No Model.)
T. A. EDISON.
MAGNETO ELECTRIC SIGNALING APPARATUS.
No. 282,287. Patented July 31, 1883.
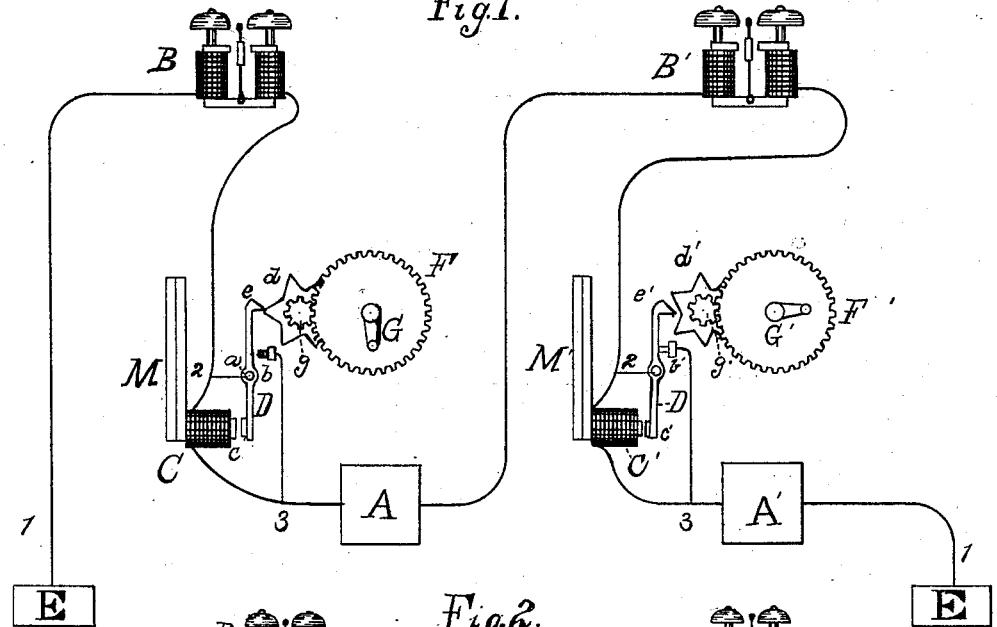
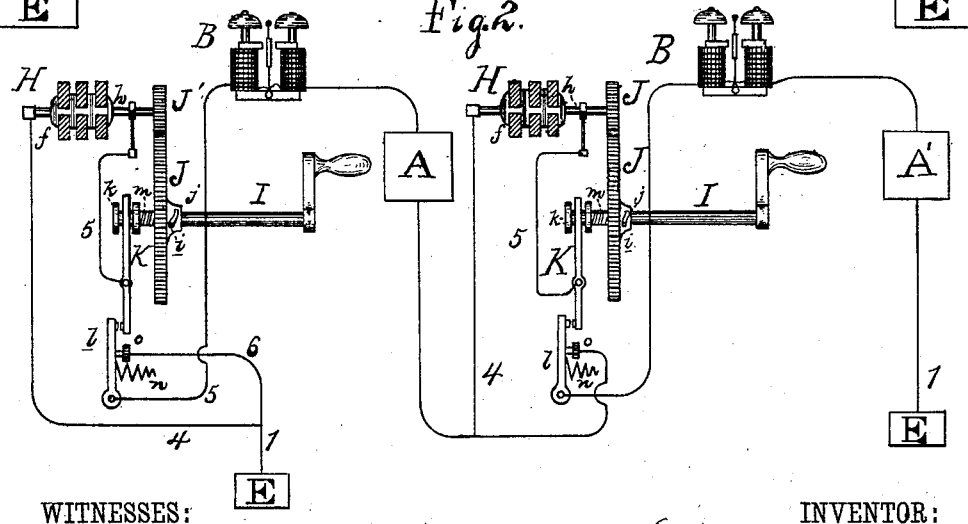
WITNESSES:
INVENTOR:

UNITED STATES PATENT OFFICE.

THOMAS A. EDISON, OF MENLO PARK, NEW JERSEY.

MAGNETO-ELECTRIC SIGNALING APPARATUS.

SPECIFICATION forming part of Letters Patent No. 282,287, dated July 31, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Magneto-Electric Signaling Apparatus, (Case No. 470,) of which the following is a specification.

My invention relates to apparatus for transmitting signals by electricity back and forth over the same line, in which apparatus the current used for signaling is generated by dynamo or magneto electric machines, my object being to provide an arrangement of such machines and the alarms operated by them so that the alarms at both ends of the line will be operated simultaneously by the working of the dynamo or magneto electric machine at either end of the line, and to provide means, to be used in connection with each dynamo or magneto electric machine, controlled by the act of operating the machine, for automatically throwing it into circuit when in use and removing it when the operation ceases, it being desirable to remove the resistance of each dynamo or magneto electric machine from the circuit when such machine is not in use. This is accomplished by arranging the dynamo or magneto electric machine at opposite ends of the line in series with the electrically-operated alarms at opposite ends of the line. The generators may be thrown automatically into and out of circuit by providing means, in connection with each generator, which shall, immediately upon the operation of the generator, open a shunt around said generator, (the generator-circuit being always closed,) which shunt is normally kept closed, and returns to such normal condition immediately on the cessation of such operation.

The breaking of the shunt-circuit may be accomplished by means of a vibrating circuit-breaker whose vibrations are caused by the act of operating the generator, it being so arranged as to close the circuit when the generator is stopped; or means may be provided for holding the shunt-circuit open continuously during the operation of the generator. As such a shunt is practically of no resistance, its closure amounts practically to the throwing of the generator entirely out of circuit. Instead of this arrangement, however, the shunt may be dispensed with, and the same effect produced by closing the main line and opening the generator-circuit when the generator is not in use, and opening the main line and closing the generator-circuit when the generator is in use.

It is preferable that the generator and the circuit-breaker employed should be operated by a continuously-revolving movement, suitable devices being employed to convert this movement into a vibrating one in case a vibrating circuit-breaker is used.

It will be understood that by the arrangement described the dynamo or magneto electric machines at both ends of the line will be normally and while at rest out of circuit. By the working of either dynamo or magneto electric machine it will be thrown automatically into circuit (the generator at the other end of the line remaining out of circuit) and into series, with the alarms at both ends of the line, which will be sounded simultaneously. Upon the cessation of the operation the generator is thrown automatically out of circuit, leaving the apparatus in its normal condition, ready for the operation of either generator.

In the annexed drawings, Figure 1 is a view, partly diagrammatic, of apparatus embodying my invention; and Fig. 2, a similar view of a modification of the same.

1 1 represent the main line, E E being the earth or ground connections. The squares A A' represent telephones, and B B are the electrically-operated bells which produce the signals. These signal-bells are arranged in series in the main line, as shown.

In Fig. 1, C C' are electro-magnets in series in the main line. The magnet C has a permanent magnet, M, or series thereof, attached to its cores, and is provided with an armature, $c$, the whole forming a magneto-electric generator, current being produced by the movement of the armature before the poles of the magnet. Such movement is produced by the following mechanism: A cog-wheel, F, turned by a crank, G, meshes with another cog-wheel, $g$, on the shaft of a star cam-wheel, $d$, having beveled pointed teeth, which engage with a point, $e$, on the end of an arm, D, to whose other end the armature $c$ is attached. This arm D is pivoted at $a$, and is connected by a wire, 2, with the main wire 1. It is adapted also to make contact with a point, $b$, from which a wire, 3, runs also to the wire 1, a shunt-circuit, 3, thus being formed around the generator.

It will be seen that when the crank G is turned a vibrating movement is imparted to the arm D and armature $c$, so that a current is generated which operates the signal; but when the revolution of the crank ceases, the point $e$ falls into one of the indentations of wheel D, and the circuit 2 3 is closed at $b$, such circuit 2 3 being a short-circuit around the generator. The magnet M will have sufficient power to hold the armature $c$ and maintain the contact at $b$, although a spring may be employed to assist the magnet. A similar arrangement exists at the other end of the line, consisting of magnet $C'$, armature $c'$, arm $D'$, contact $b'$, and gearing $G'$ $g'$ $d'$.

Instead of the arrangement of electro-magnets and permanent magnets shown, an electro-magnet could be used having a vibrating polarized armature, by which current would be generated in the coils of the electro-magnet.

Instead of using a vibrating circuit-breaker, means may be employed which will keep the circuit constantly broken during the operation of the generator. Such means are shown in Fig. 2, wherein H is a dynamo or magneto electric generator whose field-magnets are shown in horizontal section. Its armature $f$ is mounted on a shaft, $h$, and is revolved by crank-shaft I through cog-wheels J J'; or two grooved wheels connected by a belt may be substituted for the cog-wheels.

The wheel J is loose on the shaft I, the connection between them being by a pin, $i$, attached to the shaft which enters an oblique slot, $j$, in the hub of the wheel J. The traveling of pin $i$ in oblique slot $j$ moves the shaft I longitudinally in one direction, while a spiral spring, $m$, is used to move it in the other.

The shaft I has a grooved collar, $k$, which holds the pivoted lever K, whose lower end makes contact with the end of a lever, $l$, provided with a spring, $n$, and making contact with point $o$. The main line 1 1 passes through the lever $l$ and contact $o$, and the generator-circuit 4 5 is connected with the lever K.

When the crank-shaft I is turned, it will move longitudinally, and lever K will strike lever $l$, forcing it from contact $o$, and keeping it separated therefrom until the movement is stopped, when it will again make contact with $o$. This movement of lever K, forcing $l$ from $o$, completes the generator-circuit at the same time that it opens the main line. A similar apparatus is placed at the other end of the line in series with the first.

Instead of giving the crank-shaft itself a longitudinal movement, a sleeve upon said shaft may be made to move, as in my application for a patent filed September 19, 1881, and either of these forms may be used in connection either with a shunt-circuit or with the main line and generator-circuit.

In all the arrangements described the electrically-operated alarms are located in series in the line, and so are the dynamo or magneto electric machines, both alarms being sounded when either machine is worked, and both machines being normally out of circuit, and being thrown automatically into and out of circuit in the manner already fully explained.

What I claim is—

1. In a magneto-electric signaling apparatus, the combination, with the line, of electrically-operated alarms located in series in such line, dynamo or magneto electric generators located in series with such alarms, means actuated automatically by the stopping of each generator for removing its coils from the resistance of the line, and means operated automatically by the action of moving each generator to make its coils a portion of the resistance of the line, substantially as set forth.

2. In a magneto-electric signaling apparatus, the combination, with a dynamo or magneto electric generator, of a vibrating circuit-breaker operated automatically by the movement of the generator to become at short intervals a portion of the resistance of the line, and means actuated automatically by stopping the movement of the generator for removing said coils from the resistance of the line, substantially as set forth.

This specification signed and witnessed this 5th day of August, 1882.

THOS. A. EDISON.

Witnesses:
H. W. SEELY,
EDWARD H. PYATT.

It is hereby certified that in Letters Patent No. 282,287, granted July 31, 1883, to Thomas A. Edison, of Menlo Park, New Jersey, for an improvement in "Magneto-Electric Signaling Apparatus," an error appears requiring correction as follows: in line 94, page 2, of the printed specification, the following words should have been inserted after the word "generator," "and causing the coils of the generator;" and that the specification should be read with this correction therein to make it conform with the records of the case in the Patent Office.

Signed, countersigned, and sealed this 14th day of August, A. D. 1883.

[SEAL.]

M. L. JOSLYN,
*Acting Secretary of the Interior.*

Countersigned:
    E. M. MARBLE,
        *Commissioner of Patents.*